(12) United States Patent
Grover et al.

(10) Patent No.: US 10,891,592 B2
(45) Date of Patent: Jan. 12, 2021

(54) ELECTRONIC JOB POSTING MARKETPLACE

(71) Applicant: Microsoft Technology Licensing, LLC, Redmond, WA (US)

(72) Inventors: Aman Grover, Sunnyvale, CA (US); Benjamin Hoan Le, San Jose, CA (US); Qing Duan, Santa Clara, CA (US); Liang Zhang, Fremont, CA (US); Wen Pu, Santa Clara, CA (US); Zhifeng Deng, Santa Clara, CA (US); Kun Liu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/941,121

(22) Filed: Mar. 30, 2018

(65) Prior Publication Data
US 2019/0043017 A1 Feb. 7, 2019

Related U.S. Application Data

(60) Provisional application No. 62/539,838, filed on Aug. 1, 2017.

(51) Int. Cl.
| G06Q 10/10 | (2012.01) |
| G06Q 30/02 | (2012.01) |
| G06F 16/248 | (2019.01) |
| G06F 16/9535 | (2019.01) |
| G06F 16/2457 | (2019.01) |
| G06Q 50/00 | (2012.01) |

(52) U.S. Cl.
CPC ....... *G06Q 10/1053* (2013.01); *G06F 16/248* (2019.01); *G06F 16/24578* (2019.01); *G06F 16/9535* (2019.01); *G06Q 30/0249* (2013.01); *G06Q 30/0275* (2013.01); *G06Q 50/01* (2013.01)

(58) Field of Classification Search
None
See application file for complete search history.

(56) References Cited

U.S. PATENT DOCUMENTS

| 7,827,117 B2 * | 11/2010 | MacDaniel ............ G06Q 30/08 705/321 |
| 9,355,153 B2 * | 5/2016 | Rehman ............ G06F 16/24578 |
| 9,639,827 B1 * | 5/2017 | Li .................... G06F 16/951 |
| 2014/0143163 A1 | 5/2014 | Kamat et al. |
| 2015/0112795 A1 * | 4/2015 | Jalali ................ G06Q 30/0249 705/14.48 |
| 2018/0336527 A1 * | 11/2018 | Kenthapadi ........ G06Q 10/1053 |
| 2019/0034882 A1 * | 1/2019 | Saha ................ G06F 16/90335 |

FOREIGN PATENT DOCUMENTS

WO WO-2017015051 A1 * 1/2017 ............... G02F 1/29

* cited by examiner

Primary Examiner — Alexandru Cimu
(74) Attorney, Agent, or Firm — Schwegman Lundberg & Woessner, P.A.

(57) ABSTRACT

Instead of a fixed fee for a particular job application, discussed in some examples are methods, systems, and machine readable mediums which provide for a job posting service that utilizes a pay-per-click model. That is, job posters pay a fee for each time the member selects the job posting for further inquiry when that posting is shown to a member (called an impression). The fee that is paid is determined by the job poster. Selecting a job posting may comprise clicking on or otherwise entering an input signifying an intention to view the job.

21 Claims, 6 Drawing Sheets

ELECTRONIC JOB POSTING MARKETPLACE

PRIORITY CLAIM

This patent application claims the benefit of priority, under 35 U.S.C. § 119 to U.S. Provisional Patent Application Ser. No. 62/539,838, entitled "ELECTRONIC JOB POSTING MARKETPLACE," filed on Aug. 1, 2017, which is hereby incorporated by reference herein in its entirety.

TECHNICAL FIELD

Embodiments pertain to online systems for job posting marketplaces.

BACKGROUND

Online job posting services may be network-based computer services which receive job postings by employers or recruiters. These postings contain information on a job opening of an employer. Job seekers may search the posted job postings for jobs that match their qualifications. In some examples, the job seekers may apply online for the job and the employer may receive information on (e.g., resumes and/or profile information) the job seekers that applied. The employer may then decide which candidates to bring in for interviews, further evaluation, or to hire.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

To post a job on a job posting service a job poster enters job posting information such as a job title, a location, a company name, and desired and/or required qualifications. In addition the job poster pays a flat fee to activate (e.g., show) the job posting for a particular amount of time on the job posting service. During this time period the job posting is visible to job seekers and other users of the job posting service as a search result, an advertised job posting (e.g., highlighted or otherwise shown to a user like an advertisement), a recommendation to users, and the like. The fee charged by the job posting service may be very high for the job posting which poses a large barrier for entry and depending on the circumstances, may represent a poor value for some companies. For example, job posters may be unsure that the fixed fee will be worth the quality and quantity of candidates obtained from the posting.

Instead of a fixed fee for a particular job application, disclosed in some examples are methods, systems, and machine-readable mediums which provide for a job posting service that utilizes a pay-per-click model. That is, job posters do not pay a fee to show a job posting, but instead pay a fee for each time a member of the job posting service selects the job posting for further inquiry (called a "click") when that posting is shown to a member (called an impression). The fee that is paid is determined by the job poster. Selecting a job posting may comprise clicking on or otherwise entering an input signifying an intention to view the job.

The present disclosure thus enhances the user-experience of the job posting service by providing both a more results-oriented system for job posters while still maintaining relevant results for job seekers. As described below, each job posting may be scored and the score may be calculated for each user for each job on the fly as the user requests a page that has a job posting placement opportunity. The use of additional factors in selecting job postings to fill job posting placement opportunities increases a computational cost on the job posting service (resulting in additional computer processing resources consumed) and threatens to increase a delay by which user requests are handled. Small delays in processing may be detrimental to the user interface experience of the user. The disclosed system may solve these technical challenges by improving the speed at which these calculations are performed to quickly score and select job postings for presentation to one or more members by using one or more machine-learned probability models. The use of machine-learned probability models may increase a computational speed at which these calculations may be performed, minimizing latency and computational power in showing a user a page. The disclosed system may increase speed in returning search results for job postings using the machine-learned probability models.

As selecting a job posting requires showing the job posting (or a summary of it) to a user, when a job posting placement opportunity arises, the job posting service may select or order job postings to fill these opportunities based upon a job score that may depend on the price a job poster is willing to pay for a click. Thus, the more a job poster is willing to pay for a selection, the more likely the job posting will receive an impression. As a result, the disclosed system may be thought of as an auction system. In some examples, the job posting service may utilize other factors in addition to or instead of the price the job poster is willing to pay for a click in calculating the job score. For example, the job score may also factor in how relevant a job is to the particular user to which the posting is shown. As another example, the job score may consider a determined quality of the user to which the job posting is shown. Thus, in some examples, the job posting service may balance three different utilities—the job seeker's utility in finding good jobs, the job poster's utility in finding quality applicants, and the job posting service's utility in collecting payment.

In some examples, a job posting placement opportunity comprises one or more spots on a webpage, email, or other communication for recommending or otherwise advertising a job posting, a job search results page, and the like. In some examples, because utilizing only the price a job poster is willing to pay in scoring job postings may cause the presentation of jobs that do not meet the criteria of job seekers (and a subsequent decline in the usefulness of the job posting service), other factors may be utilized in calculating a job score. For example, a utility of the job posting to a member that is the target of the impression.

Figure 1:
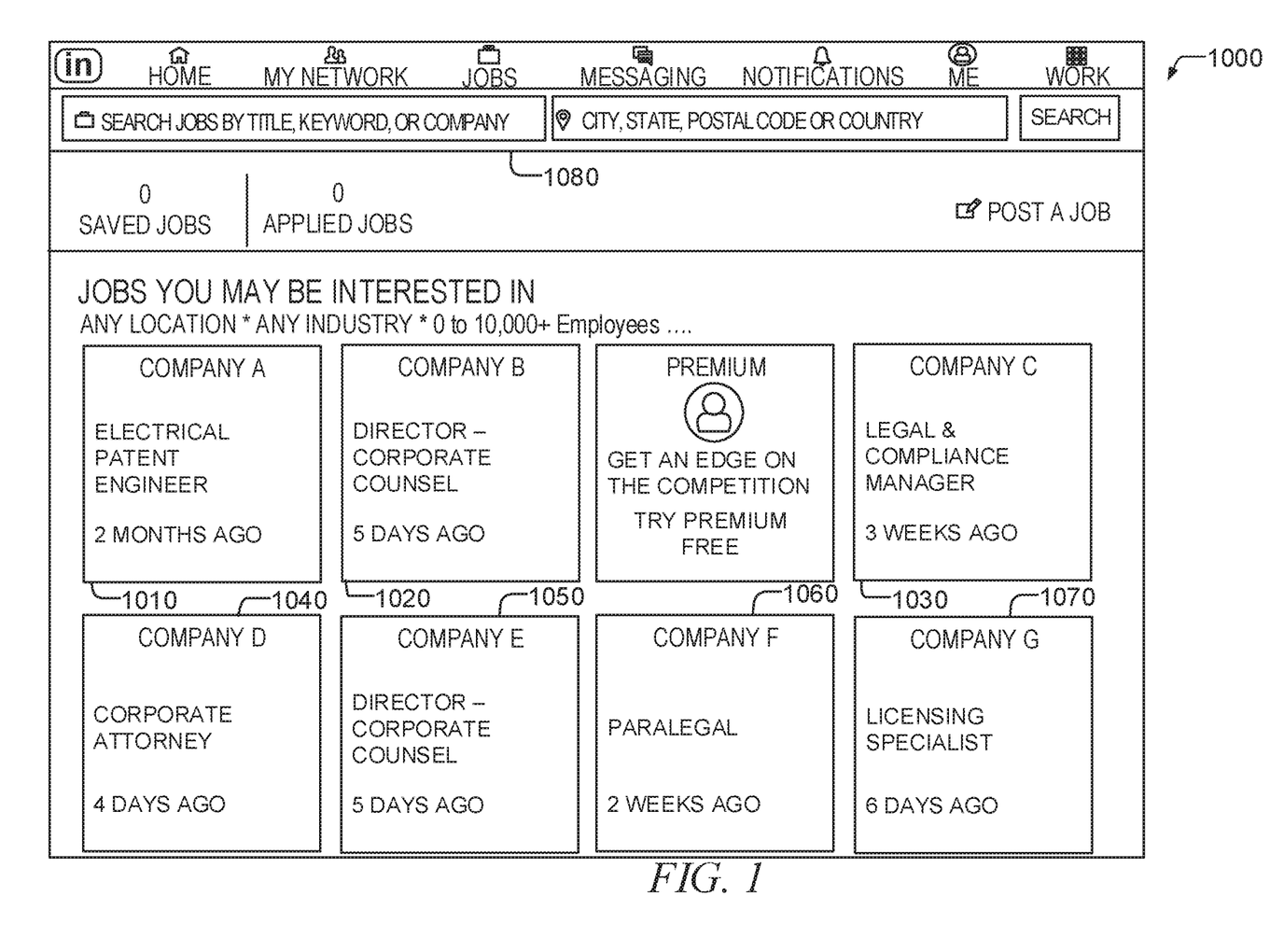
FIG. 1 shows an example Graphical User Interface provided by a job posting service according to some examples of the present disclosure.

FIG. 1 shows an example Graphical User Interface (GUI) 1000 provided by a job posting service according to some examples of the present disclosure. GUI 1000 may present job postings 1010-1070 that a user may be interested in. The GUI 1000 may also include a search box 1080 where users may search for particular job postings by title, keyword, company or by location. The presented job postings 1010-1070 may be selected based upon a matching between information known about the user (qualifications, education, experience, skills, and the like) and job posting information of jobs posted by employers. For example, a user may select an option to see jobs they may be interested in and the job posting service may initially find jobs that are relevant to the user by matching the query terms. These relevant jobs may then be presented to the user in an order that is based upon their job scores. For example, job postings with higher scores may be presented in more prominent positions than job postings with lower scores. In addition, where the number of spaces that are available for showing job postings is limited and there are more relevant job postings than spaces, the system may select the job postings to show based upon the job score. That is, the system may fill the first space with the job posting with the highest job score, the second space with the job posting with the second highest job score, and the like, until all the spaces are filled. In other examples, job posting presentation opportunities may not be responsive to a query, but instead, may be responsive to displaying a page of the job posting service (e.g., a "spot" on a member profile page, a communication page, or the like).

In one example, the system may calculate the job score using the formula:

$$job\ score = revenue\ model * Pacing\_Factor + engagement$$

where the revenue model scores how much revenue the job posting is expected to bring in for the job posting service and may be defined as:

$$revenue\ model = P(Job\ Click | Job\ Impression) * CPC$$

where CPC is cost-per-click—that is, the amount of revenue generated if a job post is selected. Thus the revenue model considers not only the bid of the job poster but the probability (denoted as P) that an impression will lead to a click or other selection (and thus a payment from the job poster to the job posting service) given an impression. The engagement attempts to ensure that the job posting service provides relevant job postings. The engagement may be defined as:

$$(P(Job\ Apply | Job\ Impression) * \mu)$$

As is understood by one of ordinary skill in the art, P(A|B) is the probability of A being true given that B is true.

Thus a score for a particular job posting that is utilized in ranking and selecting job postings to display to members comprises a revenue model that is the probability of a user clicking on a job posting given that the member has been shown the job posting multiplied by the cost-per-click. This is then multiplied by a pacing factor (which will be discussed shortly) and added to an engagement score which is the probability of the user applying for a job given a job impression multiplied by a shadow bid $\mu$. The shadow bid $\mu$ is a parameter that allows an administrator of the job posting service to adjust the weighting of the engagement factor. That is, a higher $\mu$ means that profit will decline, but engagement will improve. In some examples, the $\mu$ may be manually set. The value of $\mu$ depends on the administrator's prioritization of revenue vs. relevance to job seekers. A higher $\mu$ will emphasize relevance to job seekers and a lower p will emphasize revenue.

The P(Job Apply|Job Impression) may be estimated based upon a job fit score that quantifies how closely a particular job-seeking candidate matches a particular job posting. For example, a job seeking candidate that is a computer science major would have a higher job fit score for a computer programming job than a job seeking candidate that is an economist. In some examples, the probability may be calculated by first regressing a function that is trained using historical information on job postings and applicants that are labeled with whether the applicant applied given an impression of the job posting. After training and in operation, the function may output a numerical value for P(Job Apply|Job Impression) given the user's job fit score for a particular job posting.

Similarly, the function P(Job Click|Job Impression) may be estimated based upon the job fit score as well. In some examples, the probability may be calculated by first regressing a function that is trained using historical information on job postings and applicants that are labeled with whether the applicant clicked or otherwise selected the job posting given an impression of the job posting. After training and in operation, the function may output a numerical value for P(Job Click|Job Impression) given the user's job fit score for a particular job posting.

The pacing factor may be utilized to distribute a job poster's budget over a particular period of time. The pacing factor prevents the job poster's budget from being used up immediately. Pacing ensures uniform competition throughout the day across all job posters and automatically allocates budgets to different job postings. The pacing factor may be a score between 0 and 1 where 1 means that the system is on track to deliver the impression at the end of the day and zero means that the system is over delivering the job posting. In some examples, the pacing factor may be based upon a forecast of the number of views of the job posting over a given period of time. The forecast may be based upon one or more features (e.g., properties) of the job posting. For example, features such as time of day, day of the week, company size, company popularity, past impression on company, and the like may be individually, or in combination, used to forecast a number of views in a particular time period.

In some examples, the pacing factor may be based upon a regressed forecast model. The model may utilize the aforementioned features to forecast they, number of views from time 0 to t. For example the job posting system may regress a function:

$$y_t = \beta_t X + \epsilon$$

Where X are the features, $\epsilon$ is error and $\beta_t$ is a coefficient vector.

In some examples the predicted number of views of a time series y may be smoothed by utilizing either moving averages or exponential smoothing. Moving averages may be utilized when there is a definite rhythmic pattern in the data. An example of moving averages would to take last seven data points and average them out. Exponential smoothing is similar to moving averages where higher weights are assigned to more recent predictions and weights decrease exponentially backwards in time. For example:

$$y_t = w_1 y_{t-1} + w_2 y_{t-2} \ldots w_n y_{t-n}$$

Where the weights $W_i$ reflect a weighting for each time period. The weights may be determined based upon a regression model.

Figure 2:
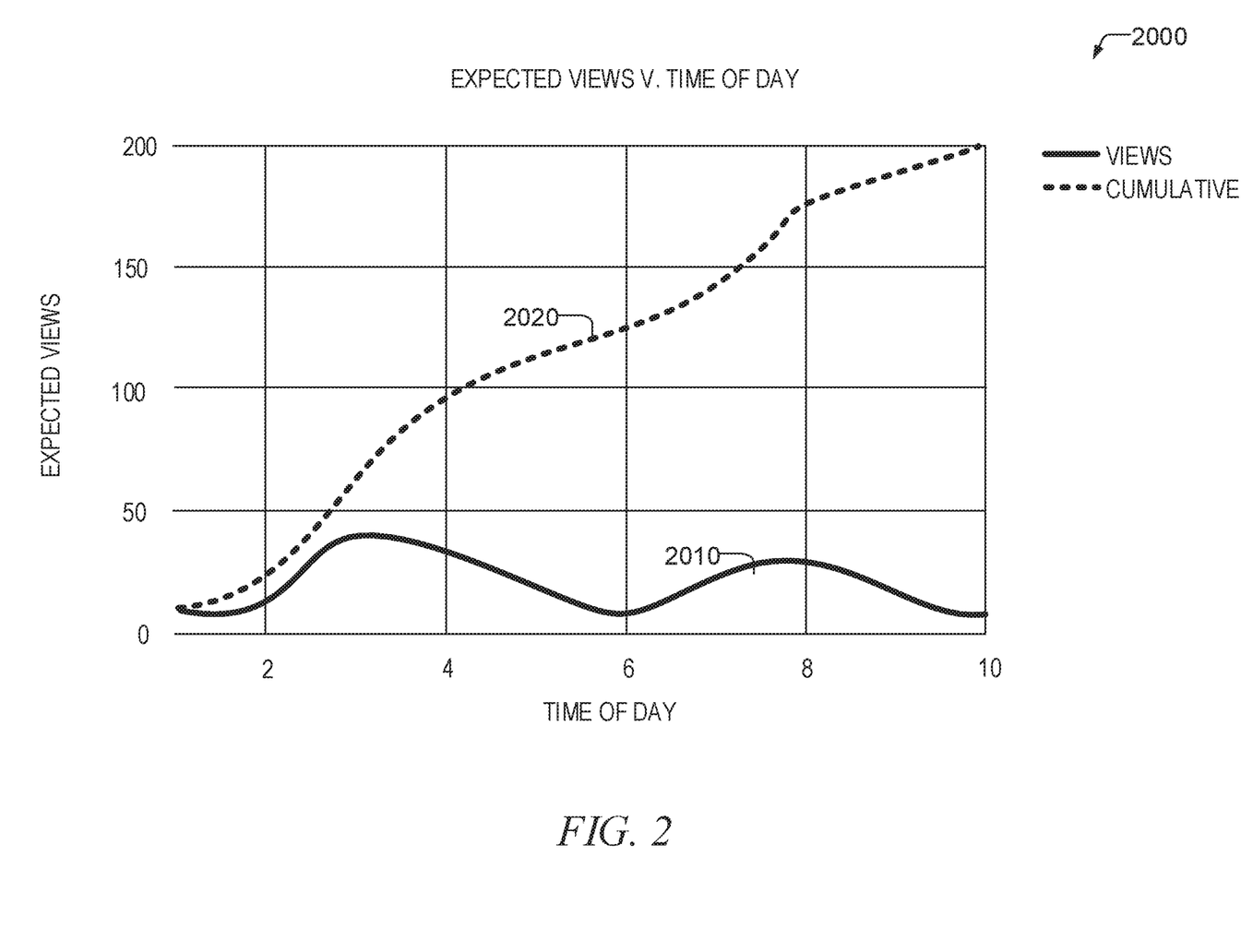
FIG. 2 shows a graph of expected views vs. time of day with a cumulative distribution according to some examples of the present disclosure.

In some examples, to calculate the pacing factor, once the forecasted views are determined, the job posting system may calculate a delivery plan. In some examples, this delivery plan may be based on expected number of views (as forecast above) aggregated across jobs at a certain interval of time. FIG. 2 shows a graph 2000 of expected views 2010 vs. time of day with a cumulative distribution 2020.

Once the forecasted views and the cumulative distributions are determined, this curve may be projected on a budget vs time graph. The predicted spend can be defined as:

$$s(t+1) = B * F(X \leq t+1) / F(X \leq T) - \sum_{m=1}^{t} s(m)$$

where, B is the total budget, s(t) is the actual budget spent, X is feature vector, m is number of intervals, s(m) is budget spent in m intervals, and F(t) is the cumulative distribution function based upon the forecast provided by the forecasting service and the past impression data. This provides a spending plan from time from t to (t+1). Stated differently, if a job poster has seen x % of a job seeking audience at time t, the goal is that the job poster have spent x % of its budget at that time.

Once s(t+1) is determined, the pacing rate may be calculated. The pacing rate may be defined as a value bounded by [0,1] where 1 means the campaign is expected to achieve its daily budget goal and 0 means the job posting service is over delivering. The pacing rate or $pr_{i,t}$ is defined as pacing rate for i job at time t, the pacing rate will be calculated as:

$$pr_{i,t_o} = C$$

$$pr_{i,t} = \{pr_{i,t-1} \text{ if } p_{i,t} = a_{it}\}$$

$$pr_{i,t} = \{pr_{i,t-1} = 1 \text{ if } p_{i,t} > a_{it}\}$$

$$pr_{i,t} = \{pr_{i,t-1} * (1-\alpha) \text{ if } p_{i,t} < a_{it}\}$$

Where C is defined as initial rate for all jobs and $a_{it}$ is the actual budget spent for job i at time t. The initial rate C may be a hyper parameter that all the jobs would start with that defines the amount of throttling.

As noted above, a first example of calculating a job score utilized a revenue model, a pacing factor, and an engagement factor. In other examples, more complicated models may be utilized. For example:

job score=job poster utility+engagement utility where:

engagement utility=$(\Sigma_i P(\text{action}_i|\text{impression}))$*shadowBid(action$_i$)

where i is a member of a set of actions I that a user can take in response to an impression and where:

job poster utility=$P(\text{click}|\text{impression})*P(\text{apply}|\text{click})$ $*P(\text{hire}|\text{apply})*\text{cost\_per\_hire}$ Thus, the job score is a combination of the job poster's utility and the engagement utility. The engagement utility is the summation of the probability that the particular user (e.g., the searching job-seeker, or the member to whom the job is displayed—termed the "target" of the impression) takes a particular action i of a set of actions multiplied by the shadow bid. In some examples, the shadow bid may be different for each of the i actions. The set of actions included may be all actions, or may be actions determined by an administrator of the job posting service. The job poster utility is the probability of a click given an impression multiplied by the probability of an application given a click multiplied by the probability of the user being hired given cost of hiring the employee.

Note that the probability of hiring an employee given an application is difficult to determine given that the hiring data is not necessarily present. Thus, in some examples, the job poster utility may be modified. For example, the job poster utility may be:

$$P(\text{click}|\text{impression})*bid_{adjusted}$$

where:

$$bid_{adjusted} = bid_{CPC}\left(\frac{P(\text{apply}|\text{click})}{P_{avg}(\text{apply}|\text{click})}\right) * \left(\frac{P(\text{quality}|\text{apply})}{P_{avg}(\text{quality}|\text{apply})}\right)$$

In this formula, the bid of the job poster may be multiplied by the probability of a particular user applying given a click divided by the average probability of an average user applying given a click multiplied by the probability of the user being a quality user given the user applying divided by the probability of an average user being quality that applies. This formula seeks to be a proxy for P(hire|apply) by leveraging the applicant quality. Furthermore, the term $$\frac{P(\text{apply}|\text{click})}{P_{avg}(\text{apply}|\text{click})}$$

seeks to apply a bid adjustment based upon whether or not this particular user is more likely than an average user to apply. In addition, the bid adjustment adjusts the bid upwards if the quality of this particular target user is above average. Note that the value of $bid_{adjusted}$ may be used both in the job posting score for a particular job placement and also in determining how much to deduct or charge the job poster for the impression.

Figure 3:
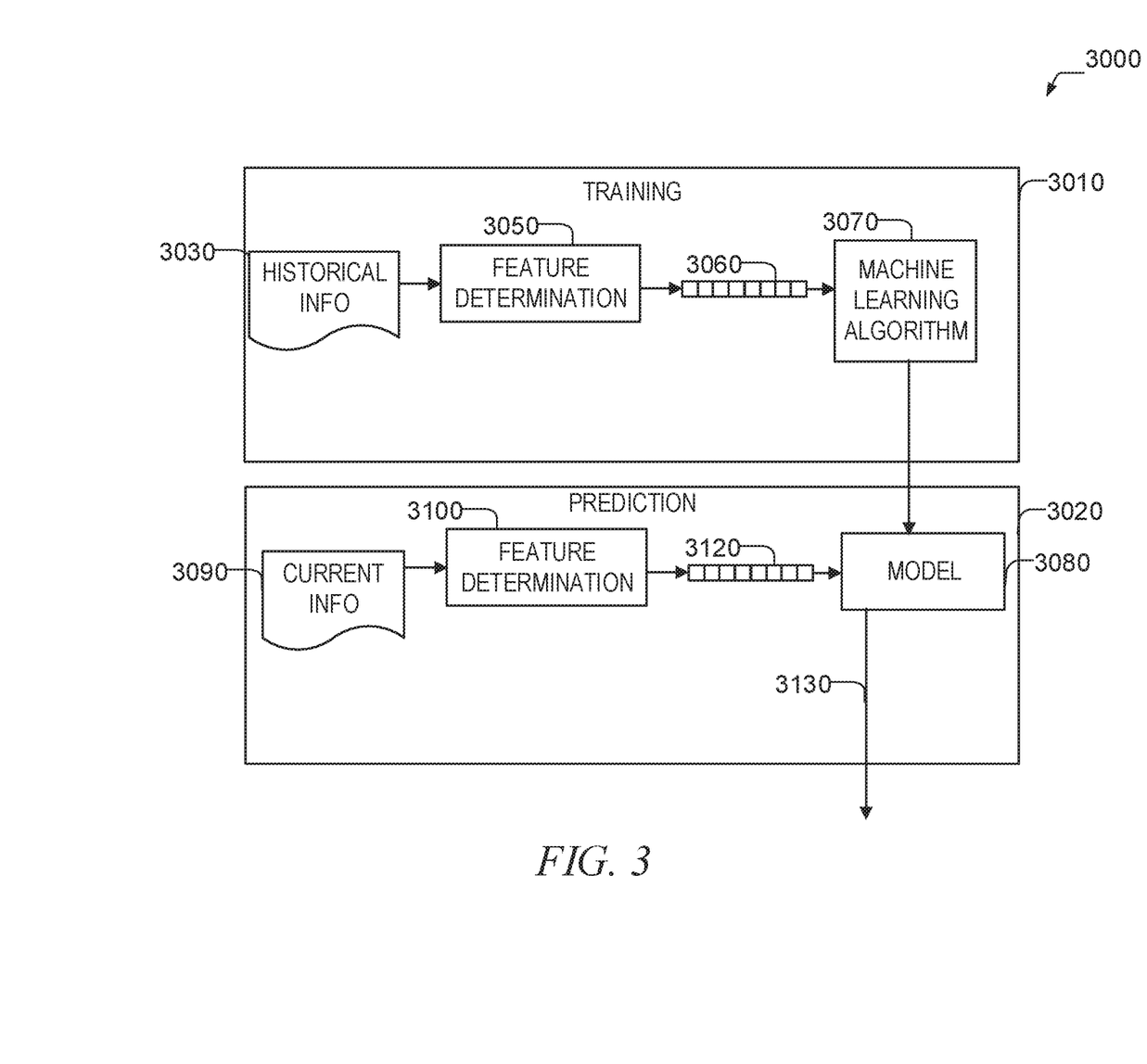
FIG. 3 shows an example machine learning module according to some examples of the present disclosure.

The system makes use of one or more probability calculations such as P(apply|click). These probabilities may be determined by machine learned regression. Similarly, forecasting ad impressions may utilize regression based upon features such as time of day, and the like. FIG. 3 shows an example machine learning module 3000 according to some examples of the present disclosure. Machine learning module 3000 utilizes a training module 3010 and a prediction module 3020. Training module 3010 inputs historical information 3030 into feature determination module 3050. The historical information 3030 may be labeled. Example labels include numerical scores (e.g., a job posting score), category labels, a number of impressions, whether the target of an impression selected or otherwise acted on the impression, whether the member applied for a job given an impression, or the like depending on the value that is to be predicted by the machine learned model 3080.

For example, if the model is to predict a number of impressions based upon features 3060 such as a time of day, a geographical region, and the like, the label may be the actual observed impressions given the historical actual feature data. As another example if the probability is a probability of a quality applicant applying, the historical data may be job application data and the quality may be applicant quality scores for the particular applicant. As another example, if the probability is a probability of a click, application, or other action given a job impression, application, or other event, then the features may include features describing the job posting, features describing the target user of the impression, a score describing how closely the job posting matches the target members qualifications (a job fit score), and/or the like. The label may be whether or not the member selected, applied for, or otherwise acted on the job posting (depending on the unknown latent variable) given the event and those features.

Feature determination module 3050 determines one or more features 3060 from this historical information 3030. Stated generally, features 3060 are a set of the information input and is information determined to be predictive of a particular outcome. Example features are given above. In some examples, the features 3060 may be all the historical activity data, but in other examples, the features 3060 may be a subset of the historical activity data. The machine learning algorithm 3070 produces a model 3080 based upon the features 3060 and the label.

In the prediction module 3020, current information 3090 may be input to the feature determination module 3100. Feature determination module 3100 may determine the same set of features or a different set of features from the current information 3090 as feature determination module 3050 determined from historical information 3030. In some examples, feature determination module 3100 and 3050 are the same module. Feature determination module 3100 produces feature vector 3120, which is input into the model 3080 to generate a likelihood of response score 3130. The training module 3010 may operate in an offline manner to train the model 3080. The prediction module 3020, however, may be designed to operate in an online manner. It should be noted that the model 3080 may be periodically updated via additional training and/or user feedback.

The machine learning algorithm 3070 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 3010. In an example embodiment, a regression model is used and the model 3080 is a vector of coefficients corresponding to a learned importance for each of the features in the vector of features 3060, 3120. To calculate a score, a dot product of the feature vector 3120 and the vector of coefficients of the model 3080 is taken.

In addition, as noted above, some of the job post scores may be calculated based upon an applicant quality score. Features based upon the applicant and the job posting information, such as education, job function, job industry, skills, years of professional experience, job title, job location, size of organization/company, and job seniority. Historical candidate management events (e.g., interview, hiring, explicit feedback on the quality or "fit" of the candidate) may be utilized along with corresponding historical candidate data to train one or more decision trees that output one or more scores that may be combined to create an applicant quality score. In some examples, the applicant quality score may be calculated by having a separate random forest classifier for each of a set of features that compares a fit between the candidate and the job posting. For example, a random forest classifier that outputs a value between 0 and 1 based upon a percentage of skills that the applicant has that are required for the job posting. The values of a plurality of such classifiers may then be combined (e.g., a weighted summation) to produce a quality score.

Figure 4:
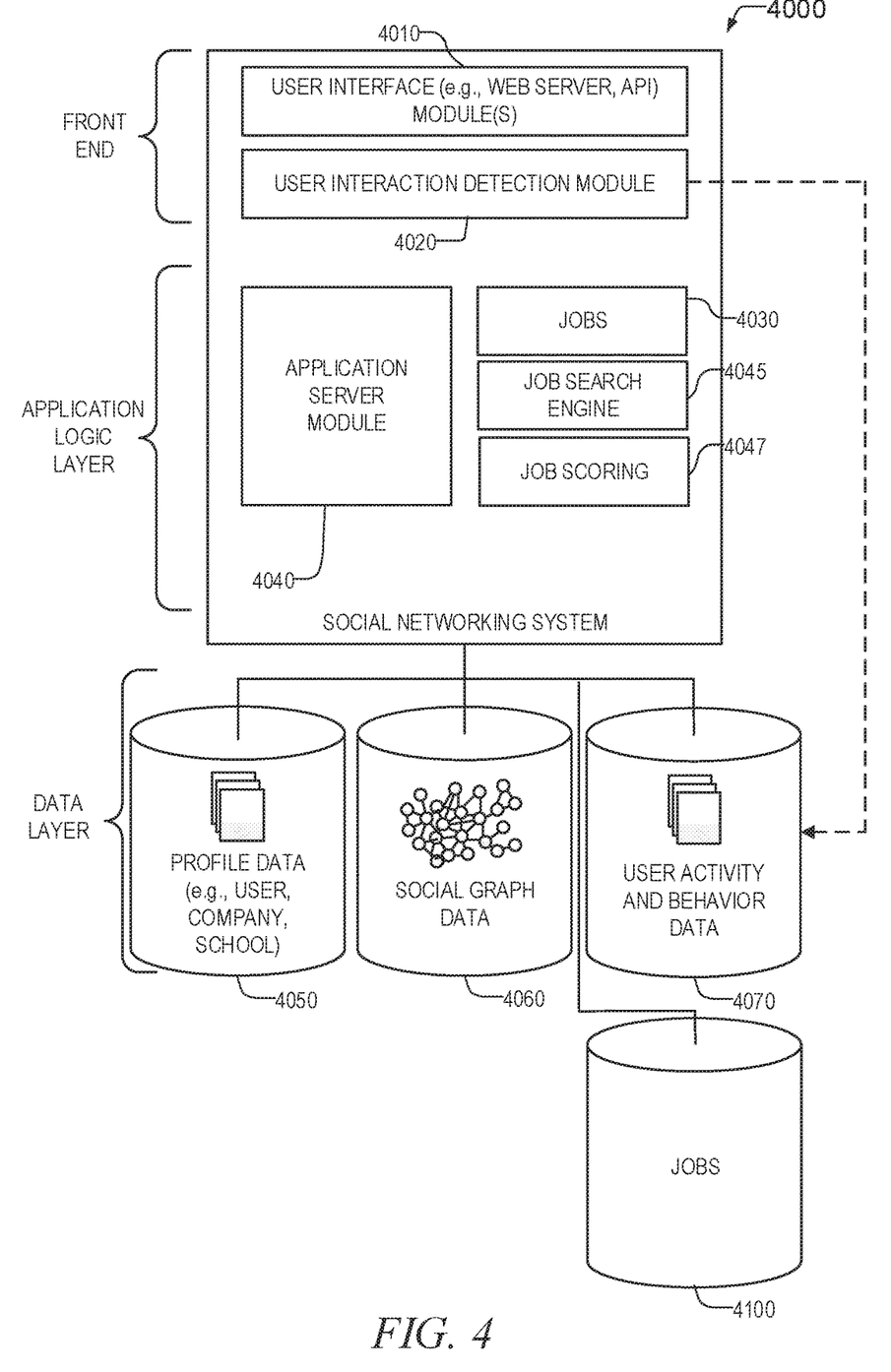
FIG. 4 is a block diagram showing the functional components of a job posting service according to some examples of the present disclosure.

FIG. 4 is a block diagram showing the functional components of a job posting service 4000. As shown in FIG. 4, a front end module may comprise a user interface module (e.g., a web server) 4010, which receives requests from various client-computing devices, and communicates appropriate responses to the requesting client devices. For example, the user interface module(s) 4010 may receive requests in the form of Hypertext Transport Protocol (HTTP) requests, or other network-based, application programming interface (API) requests (e.g., from a dedicated application running on a client device). In addition, a user interaction and detection module 4020 may be provided to detect various interactions that users have with different applications, services and content presented. As shown in FIG. 4, upon detecting a particular interaction, the user interaction and detection module 4020 logs the interaction, including the type of interaction and any meta-data relating to the interaction, in the user activity and behavior database 4070.

An application logic layer may include one or more various application server modules 4040, which, in conjunction with the user interface module(s) 4010, generate various graphical user interfaces (e.g., web pages) with data retrieved from various data sources in the data layer. With some embodiments, application server module 4040 is used to implement the functionality associated with various applications and/or services provided by the job posting service as discussed above.

Application logic layer may also include jobs module 4030 which, in conjunction with application server module 4040, user interface modules 4010, job search module 4045, and job scoring module 4047, provide the ability to post jobs (including inputting a cost-per-click or other interaction and setting a total budget), view jobs, search jobs, apply for jobs, and the like via one or more user interfaces provided by jobs module 4030 in cooperation with user interface 4010 to users of the job posting service 4000. Job search module 4045, in conjunction with jobs module 4030, may provide the ability for users to search job postings based upon one or more search criteria. Criteria include job function, date the job was posted, job locations, job titles, job pay, company, industry, skills required for the job, job score, and the like. In some examples, the search results may be ranked based upon a score produced by the job scoring module 4047 which may utilize job posting data, cost-per-click, job posting budget, job seeker information, and the like as noted by the formulas previously disclosed to score a particular job for a particular member at a particular time. In other examples, jobs module 4030 may interface with the user interface module 4010 to show one or more job postings to users on profile pages or other pages of the job posting service 4000. For example, if the job posting service 4000 is part of a social networking service, a highest ranked job may be presented as an advertisement to a member, for example, on a profile page.

Jobs data structures 4100 may be part of a data layer which may include several other databases, such as a database 4050 for storing profile data, including both member profile data as well as profile data for various organizations (e.g., companies, schools, etc.). Consistent with some embodiments, when a person initially registers to become a member of the job posting service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 4050. Similarly, when a representative of an organization (e.g., a job poster) initially registers the organization with the job posting service, the representative may be prompted to provide certain information about the organization. This information may be stored, for example, in the database 4050, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

In some examples, as noted the job posting service may be integrated with a social networking service. In these examples, information describing the various associations and relationships, such as connections that the members establish with other members, or with other entities and objects, is stored and maintained within a social graph in the social graph database 4060. Also, as members interact with the various applications, services, and content made available via the social networking service, the members' interactions and behavior (e.g., content viewed, links or buttons selected, messages responded to, etc.) may be tracked and information concerning the member's activities and behavior may be logged or stored, for example, as indicated in FIG. 4 by the user activity and behavior database 4070.

With some embodiments, the job posting service 4000 provides an application programming interface (API) module with the user interface module 4010 via which applications and services can access various data and services provided or maintained by the job posting service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Figure 5:
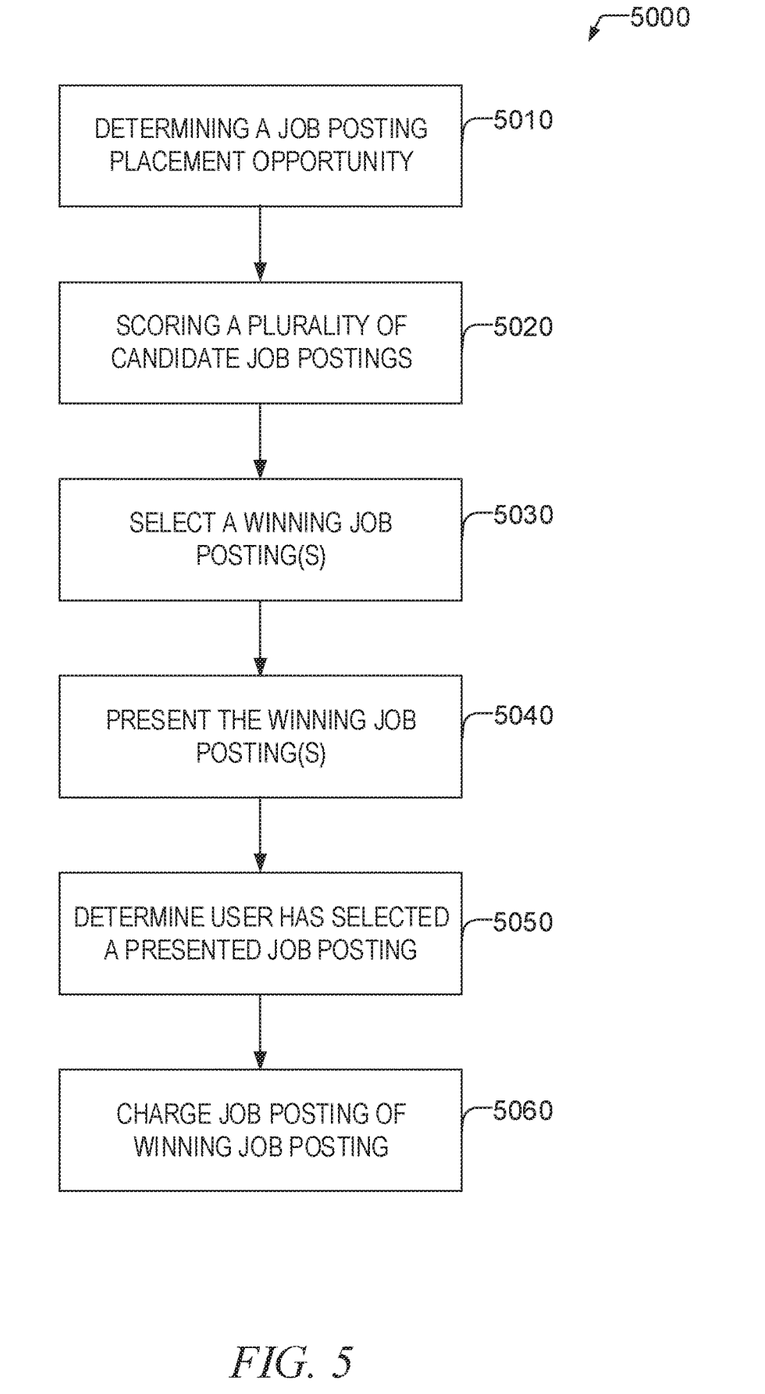
FIG. 5 shows a flowchart of an example method of providing a job posting service according to some examples of the present disclosure.

FIG. 5 shows a flowchart of an example method 5000 of providing a job posting service according to some examples of the present disclosure. At operation 5010 the job posting service may determine that a job posting placement opportunity has arisen. For example, a user may visit the job posting service and the job posting placement opportunity may be an advertisement on a page delivered to the user (e.g., a profile page or other page). In another example, a user may search for job postings and the search results page may include job posting placement opportunities. At operation 5020 a set of candidate job postings may be determined and scored. For example, job postings that match search results of a member, job postings that have criteria that match information known about a member (e.g., the job is looking for people in the same field, with a same educational background, with a same experience level, and/or the like as the member), and/or the like. These set of candidate job postings may be scored using the formulas disclosed above. At operation 5030 a winning job posting(s) may be selected from the candidate set of job postings. For example, one or more of the highest scoring job postings may be selected (the number selected may depend on the number of job posting placement opportunities determined at operation 5010).

At operation 5040 the winning job posting(s) selected at operation 5030 may be presented to the user. If the user selects (e.g., clicks or otherwise indicates a desire to see more about the job posting) one or more of the winning job posting(s), this selection is detected at operation 5050. At operation 5060 an account of the job poster that posted the selected job posting is charged the bid price (e.g., the price the poster agreed to pay for a "click"—the CPC).

In some examples, the job posting service may be provided by a social networking service. A social networking service is a computer- or web-based application that enables users to establish links or connections with persons for the purpose of sharing information with one another. A social networking service is a type of networked service provided by one or more computer systems accessible over a network that allows members of the service to build or reflect social networks or social relations among members. Members may be individuals or organizations. Typically, members construct profiles, which may include personal information such as the member's name, contact information, employment information, photographs, personal messages, status information, multimedia, links to web-related content, blogs, and so on. In order to build or reflect the social networks or social relations among members, the social networking service allows members to identify, and establish links or connections with other members. For instance, in the context of a business networking service (a type of social networking service), a member may establish a link or connection with his or her business contacts, including work colleagues, clients, customers, personal contacts, and so on. With a social networking service, a member may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of, business networking purposes; and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or otherwise corresponds to an information access privilege, such that a first member who has established a connection with a second member is, via the establishment of that connection, authorizing the second member to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or "following" process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other connection-based social networking services also may allow following-type relationships as well. For example, the social networking service LinkedIn® allows members to follow particular companies.

Figure 6:
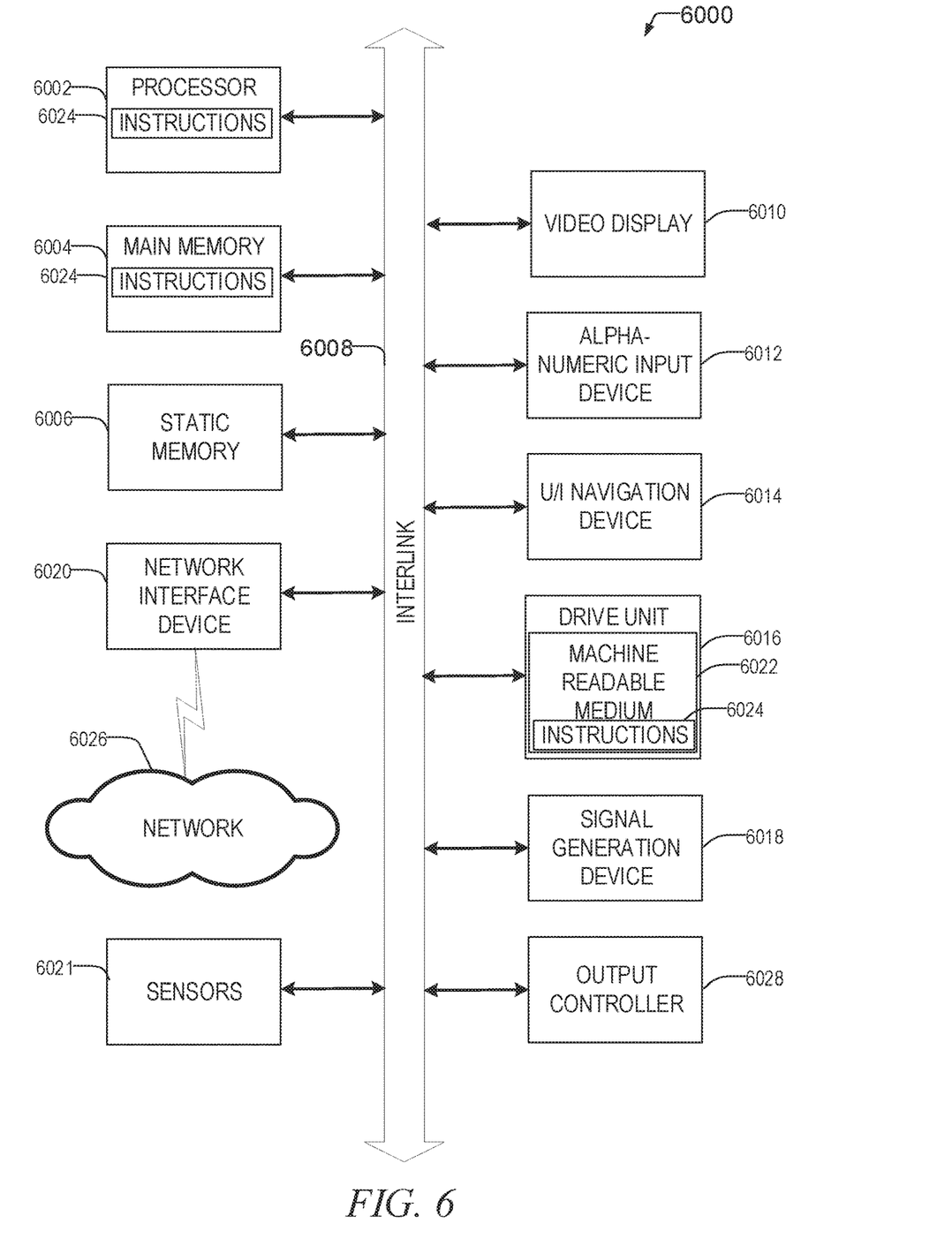
FIG. 6 illustrates a block diagram of an example machine upon which any one or more of the techniques (e.g., methodologies) discussed herein may be performed, according to some examples of the present disclosure.

FIG. 6 illustrates a block diagram of an example machine 6000 upon which any one or more of the techniques (e.g., methodologies) discussed herein may perform. In alternative embodiments, the machine 6000 may operate as a standalone device or may be connected (e.g., networked) to other machines. In a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may be a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 6000 may be configured to implement the job posting service 4000, or may be communicatively linked with other similar machines to implement the system 4000. Machine 6000 may produce one or more renderable graphical user interfaces (GUIs) such as FIG. 1, implement the machine learning module 3000, and perform the method 5000 of FIG. 5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, or any combination thereof), a main memory 6004 and a static memory 6006, some or all of which may communicate with each other via an interlink (e.g., bus) 6008. The machine 6000 may further include a display unit 6010, an alphanumeric input device 6012 (e.g., a keyboard), and a user interface (UI) navigation device 6014 (e.g., a mouse). In an example, the display unit 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 6024 may further be transmitted or received over a communications network 6026 using a transmission medium via the network interface device 6020. The Machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MIMO), or multiple-input single-output (MISO) techniques. In some examples, the network interface device 6020 may wirelessly communicate using Multiple User MIMO techniques.

Other Notes and Non-Limiting Examples

Example 1 is a method for providing a job posting service, the method comprising: at a computing device of the job posting service, using a processor: determining a job posting placement opportunity for showing a job posting to a member of the job posting service; scoring each particular one of a plurality of candidate job postings based upon at least a corresponding cost-per-click of the particular one of the candidate job postings and a relevance of a job described by the particular one of the candidate job postings to the member; selecting a winning job posting of the plurality of candidate job postings based upon the scores; presenting the winning job posting to the member in a user interface; determining that the member has selected the winning job posting; and charging a job poster that placed the winning job posting an amount based upon the cost-per-click.

In Example 2, the subject matter of Example 1 includes, wherein scoring each particular one of a plurality of candidate job postings based upon at least a corresponding cost-per-click of the particular one of the candidate job postings and a relevance of a job described by the particular one of the candidate job postings to the member comprises: calculating the score based also on a calculated probability of the member selecting the particular one of the candidate job postings given the member is shown the particular one of the candidate job postings.

In Example 3, the subject matter of Examples 1-2 includes, wherein the job posting placement opportunity comprises a search results screen.

In Example 4, the subject matter of Examples 1-3 includes, wherein the job posting placement opportunity includes a display of a job posting with a member profile of the member of the job posting service.

In Example 5, the subject matter of Examples 1-4 includes, wherein the job posting service is provided by a social networking service.

In Example 6, the subject matter of Examples 1-5 includes, wherein scoring each particular one of a plurality of candidate job postings based upon at least a corresponding cost-per-click of the particular one of the candidate job postings and a relevance of a job described by the particular one of the candidate job postings to the member comprises utilizing a pacing factor to distribute a job poster's budget over a particular period of time.

In Example 7, the subject matter of Examples 1-6 includes, wherein the relevance of the job described by the particular one of the candidate job postings to the member comprises a probability of the member applying for the particular one of the candidate job postings given the member was shown the particular one of the candidate job postings.

Example 8 is a job posting service comprising: a processor; a memory communicatively coupled to the processor and comprising instructions that when executed by the processor, cause the job posting service to perform operations comprising: determining a job posting placement opportunity for showing a job posting to a member of the job posting service; scoring each particular one of a plurality of candidate job postings based upon at least a corresponding cost-per-click of the particular one of the candidate job postings and a relevance of a job described by the particular one of the candidate job postings to the member; selecting a winning job posting of the plurality of candidate job postings based upon the scores; presenting the winning job posting to the member in a user interface; determining that the member has selected the winning job posting; and charging a job poster that placed the winning job posting an amount based upon the cost-per-click.

In Example 9, the subject matter of Example 8 includes, wherein the operations of scoring each particular one of a plurality of candidate job postings based upon at least a corresponding cost-per-click of the particular one of the candidate job postings and a relevance of a job described by the particular one of the candidate job postings to the member comprises: calculating the score based also on a calculated probability of the member selecting the particular one of the candidate job postings given the member is shown the particular one of the candidate job postings.

In Example 10, the subject matter of Examples 8-9 includes, wherein the job posting placement opportunity comprises a search results screen.

In Example 11, the subject matter of Examples 8-10 includes, wherein the job posting placement opportunity comprises displaying a job posting with a member profile of the member of the job posting service.

In Example 12, the subject matter of Examples 8-11 includes, wherein the job posting service is also a social networking service.

In Example 13, the subject matter of Examples 8-12 includes, wherein the operations of scoring each particular one of a plurality of candidate job postings based upon at least a corresponding cost-per-click of the particular one of the candidate job postings and a relevance of a job described by the particular one of the candidate job postings to the member comprises utilizing a pacing factor to distribute a job poster's budget over a particular period of time.

In Example 14, the subject matter of Examples 8-13 includes, wherein the relevance of the job described by the particular one of the candidate job postings to the member comprises a probability of the member applying for the particular one of the candidate job postings given the member was shown the particular one of the candidate job postings.

Example 15 is a non-transitory machine readable medium comprising instructions, that when executed by a machine, cause the machine to perform operations comprising: determining a job posting placement opportunity for showing a job posting to a member of the job posting service; scoring each particular one of a plurality of candidate job postings based upon at least a corresponding cost-per-click of the particular one of the candidate job postings and a relevance of a job described by the particular one of the candidate job postings to the member; selecting a winning job posting of the plurality of candidate job postings based upon the scores; presenting the winning job posting to the member in a user interface; determining that the member has selected the winning job posting; and charging a job poster that placed the winning job posting an amount based upon the cost-per-click.

In Example 16, the subject matter of Example 15 includes, wherein the operations of scoring each particular one of a plurality of candidate job postings based upon at least a corresponding cost-per-click of the particular one of the candidate job postings and a relevance of a job described by the particular one of the candidate job postings to the member comprises: calculating the score based also on a calculated probability of the member selecting the particular one of the candidate job postings given the member is shown the particular one of the candidate job postings.

In Example 17, the subject matter of Examples 15-16 includes, wherein the job posting placement opportunity comprises a search results screen.

In Example 18, the subject matter of Examples 15-17 includes, wherein the job posting placement opportunity comprises displaying a job posting with a member profile of the member of the job posting service.

In Example 19, the subject matter of Examples 15-18 includes, wherein the job posting service is also a social networking service.

In Example 20, the subject matter of Examples 15-19 includes, wherein the operations of scoring each particular one of a plurality of candidate job postings based upon at least a corresponding cost-per-click of the particular one of the candidate job postings and a relevance of a job described by the particular one of the candidate job postings to the member comprises utilizing a pacing factor to distribute a job poster's budget over a particular period of time.

In Example 21, the subject matter of Examples 15-20 includes, wherein the relevance of the job described by the particular one of the candidate job postings to the member comprises a probability of the member applying for the particular one of the candidate job postings given the member was shown the particular one of the candidate job postings.

Example 22 is a computing device for providing a job posting service, the computing device comprising: means for determining a job posting placement opportunity for showing a job posting to a member of the job posting service; means for scoring each particular one of a plurality of candidate job postings based upon at least a corresponding cost-per-click of the particular one of the candidate job postings and a relevance of a job described by the particular one of the candidate job postings to the member; means for selecting a winning job posting of the plurality of candidate job postings based upon the scores; means for presenting the winning job posting to the member in a user interface; means for determining that the member has selected the winning job posting; and means for charging a job poster that placed the winning job posting an amount based upon the cost-per-click.

In Example 23, the subject matter of Example 22 includes, wherein the means for scoring each particular one of a plurality of candidate job postings based upon at least a corresponding cost-per-click of the particular one of the candidate job postings and a relevance of a job described by the particular one of the candidate job postings to the member comprises: means for calculating the score based also on a calculated probability of the member selecting the particular one of the candidate job postings given the member is shown the particular one of the candidate job postings.

In Example 24, the subject matter of Examples 22-23 includes, wherein the job posting placement opportunity comprises a search results screen.

In Example 25, the subject matter of Examples 22-24 includes, wherein the job posting placement opportunity includes a display of a job posting with a member profile of the member of the job posting service.

In Example 26, the subject matter of Examples 22-25 includes, wherein the job posting service is provided by a social networking service.

In Example 27, the subject matter of Examples 22-26 includes, wherein the means for scoring each particular one of a plurality of candidate job postings based upon at least a corresponding cost-per-click of the particular one of the candidate job postings and a relevance of a job described by the particular one of the candidate job postings to the member comprises means for utilizing a pacing factor to distribute a job poster's budget over a particular period of time.

In Example 28, the subject matter of Examples 22-27 includes, wherein the relevance of the job described by the particular one of the candidate job postings to the member comprises a probability of the member applying for the particular one of the candidate job postings given the member was shown the particular one of the candidate job postings.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A method for providing a network-accessible job posting service, the method comprising:

at a computing device of the job posting service, using a processor:

receiving a request for content files from a computing device of a member of the job posting service;

identifying at least two open content slots in the content files that are to be delivered to the member of the job posting service;

responsive to identifying the open content slots, calculating a job score for each particular one of a plurality of candidate job postings based upon at least a corresponding cost-per-click of the particular one of the candidate job postings and a relevance score of a job described by the particular one of the candidate job postings to the member, the relevance score calculated based upon a machine-learned probability model that predicts whether the member would take a particular action given an impression of the particular candidate job posting, the machine-learned probability model trained using training data comprising past job posting impressions and labelled with whether a member took the particular action, the cost-per-click being a bid price selected by a job poster that placed the particular one of the plurality of candidate job postings;

selecting two winning job postings of the plurality of candidate job postings based upon the scores;

inserting information about the winning job postings in the content files, the winning job postings ordered based upon their scores;

transmitting the content files including the information about the winning job postings, to the computing device of the member over the network the content files being displayed by the computing device of the member, including the information about the winning job postings;

receiving a request for a particular one of the winning job postings from the computing device of the member for a particular one of the winning job postings;

sending the particular one of the winning job postings to the computing device of the member; and responsive to sending the particular one of the winning job postings, charging an account of a job poster that placed the particular one of the winning job postings an amount based upon the cost-per-click.

2. The method of claim 1, wherein calculating a job for each particular one of a plurality of candidate job postings based upon at least a corresponding cost-per-click of the particular one of the candidate job postings and a relevance score of a job described by the particular one of the candidate job postings to the member comprises: calculating the score based also on a calculated probability of the member selecting the particular one of the candidate job postings given the member is shown the particular one of the candidate job postings.

3. The method of claim 1, wherein the open content slots comprise a search results screen.

4. The method of claim 1, wherein the content files comprise files describing a member profile of the member of the job posting service.

5. The method of claim 1, wherein the job posting service is provided by a social networking service.

6. The method of claim 1, wherein calculating a job score for each particular one of a plurality of candidate job postings based upon at least a corresponding cost-per-click of the particular one of the candidate job postings and a relevance score of a job described by the particular one of the candidate job postings to the member comprises utilizing a pacing factor to distribute a job poster's budget over a particular period of time.

7. The method of claim 1, wherein the relevance score of the job described by the particular one of the candidate job postings to the member is calculated based upon a probability of the member applying for the particular one of the candidate job postings given the member was shown the particular one of the candidate job postings.

8. A computing device providing a job posting service comprising:

a processor;

a memory communicatively coupled to the processor and comprising instructions that when executed by the processor, cause the job posting service to perform operations comprising:

receiving a request for content files from a computing device of a member of the job posting service;

identifying at least two open content slots in the content files that are to be delivered to the member of the job posting service;

responsive to identifying the open content slots, calculating a job score for each particular one of a plurality of candidate job postings based upon at least a corresponding cost-per-click of the particular one of the candidate job postings and a relevance score of a job described by the particular one of the candidate job postings to the member, the relevance score calculated based upon a machine-learned probability model that predicts whether the member would take a particular action given an impression of the particular candidate job posting, the machine-learned probability model trained using training data comprising past job posting impressions and labelled with whether a member took the cost-per-click being a bid price selected by a job poster that placed the particular one of the plurality of candidate job postings;

selecting two winning job postings of the plurality of candidate job postings based upon the scores;

inserting information about the winning job postings in the content files, the winning job postings ordered based upon their scores;

transmitting the content files, including the information about the winning job postings, to the computing device of the member over the network, the content files being displayed bv the computing device of the member, including the information about the winning job postings;

receiving a request for a particular one of the winning job postings from the computing device of the member for a particular one of the winning job postings;

sending the particular one of the winning job postings to the computing device of the member; and responsive to sending the particular one of the winning job postings, charging an account of a job poster that placed the particular one of the winning job postings an amount based upon the cost-per-click.

9. The computing device of claim 8, wherein the operations of calculating a job score for each particular one of a plurality of candidate job postings based upon at least a corresponding cost-per-click of the particular one of the candidate job postings and a relevance score of a job described by the particular one of the candidate job postings to the member comprises: calculating the score based also on a calculated probability of the member selecting the particular one of the candidate job postings given the member is shown the particular one of the candidate job postings.

10. The computing device of claim 8, wherein the open content slots comprise a search results screen.

11. The computing device of claim 8, wherein the content files comprise files describing a member profile of the member of the job posting service.

12. The computing device of claim 8, wherein the job posting service is also a social networking service.

13. The computing device of claim 8, wherein the operations of calculating a job score for each particular one of a plurality of candidate job postings based upon at least a corresponding cost-per-click of the particular one of the candidate job postings and a relevance score of a job described by the particular one of the candidate job postings to the member comprises utilizing a pacing factor to distribute a job poster's budget over a particular period of time.

14. The computing device of claim 8, wherein the relevance score of the job described by the particular one of the candidate job postings to the member is calculated based upon a probability of the member applying for the particular one of the candidate job postings given the member was shown the particular one of the candidate job postings.

15. A non-transitory machine readable medium comprising instructions, that when executed by a machine, cause the machine to perform operations comprising:
    receiving a request for content files from a computing device of a member of the job posting service;
    identifying at least two open content slots in the content files that are to be delivered to the member of the job posting service;
    responsive to identifying the open content slots, calculating a job score for each particular one of a plurality of candidate job postings based upon at least a corresponding cost-per-click of the particular one of the candidate job postings and a relevance score of a job described by the particular one of the candidate job postings to the member, the relevance score calculated based upon a machine-learned probability model that predicts whether the member would take a particular action given an impression of the particular candidate job posting, the machine-learned probability model trained using training data comprising past job posting impressions and labelled with whether a member took the particular action, the cost-per-click being a bid price selected by a job poster that placed the particular one of the plurality of candidate job postings;
    selecting two winning job postings of the plurality of candidate job postings based upon the scores;
    inserting information about the winning job postings in the content files, the winning job postings ordered based upon their scores;
    transmitting the content files, including the information about the winning job postings, to the computing device of the member over the network, the content files being displayed by the computing device of the member, including the information about the winning job postings;
    receiving a request for a particular one of the winning job postings from the computing device of the member for a articular one of the winning job postings; sending the particular one of the winning job postings to the computing device of the member; and
    responsive to sending the particular one of the winning job postings, charging an account of a job poster that placed the particular one of the winning job postings an amount based upon the cost-per-click.

16. The machine readable medium of claim 15, wherein the operations of calculating a job score for each particular one of a plurality of candidate job postings based upon at least a corresponding cost-per-click of the particular one of the candidate job postings and a relevance score of a job described by the particular one of the candidate job postings to the member comprises: calculating the score based also on a calculated probability of the member selecting the particular one of the candidate job postings given the member is shown the particular one of the candidate job postings.

17. The machine readable medium of claim 15, wherein the open content slots comprise a search results screen.

18. The machine readable medium of claim 15, wherein the content files comprise files describing a member profile of the member of the job posting service.

19. The machine readable medium of claim 15, wherein the job posting service is also a social networking service.

20. The machine readable medium of claim 15, wherein the operations of calculating a job score for each particular one of a plurality of candidate job postings based upon at least a corresponding cost-per-click of the particular one of the candidate job postings and a relevance score of a job described by the particular one of the candidate job postings to the member comprises utilizing a pacing factor to distribute a job poster's budget over a particular period of time.

21. A device for providing a network-accessible job posting service, the device comprising:
    means for receiving a request for content files from a computing device of a member of the job posting service;
    means for identifying at least two open content slots in the content files that are to be delivered to the member of the job posting service;
    means for, responsive to identifying the open content slots, calculating a job score for each particular one of a plurality of candidate job postings based upon at least a corresponding cost-per-click of the particular one of the candidate job postings and a relevance score of a job described by the particular one of the candidate job postings to the member, the relevance score calculated based upon a machine-learned probability model that predicts whether the member would take a particular action given an impression of the particular candidate job posting, the machine-learned probability model trained using training data comprising past job posting impressions and labelled with whether a member took the particular action, the cost-per-click being a bid price selected by a job poster that placed the particular one of the plurality of candidate job postings;
    means for selecting two winning job postings of the plurality of candidate job postings based upon the scores;
    means for inserting information about the winning job postings in the content files, the winning job postings ordered based upon their scores;
    means for transmitting the content files, including the information about the winning job postings, to the computing device of the member over the network the content files being displayed by the computing device of the member including the information about the winning job posting;

means for receiving a request for a articular one of the winning job postings from the computing device of the member for a particular one of the winning job postings;

means for sending the particular one of the winning job postings to the computing device of the member; and means for, responsive to sending the Particular one of the winning job postings, charging an account of a job poster that placed the particular one of the winning job postings an amount based upon the cost-per-click.

* * * * *

UNITED STATES PATENT AND TRADEMARK OFFICE
CERTIFICATE OF CORRECTION

PATENT NO. : 10,891,592 B2  
APPLICATION NO. : 15/941121  
DATED : January 12, 2021  
INVENTOR(S) : Grover et al.

Page 1 of 1

It is certified that error appears in the above-identified patent and that said Letters Patent is hereby corrected as shown below:

In the Claims

In Column 17, Line 38, in Claim 1, delete "files" and insert --files,-- therefor In Column 17, Line 40, in Claim 1, delete "network" and insert --network,-- therefor In Column 17, Line 53, in Claim 2, after "job", insert --score--

In Column 18, Line 41, in Claim 8, after "took", insert --the particular action,--

In Column 18, Line 53, in Claim 8, delete "bv" and insert --by-- therefor

In Column 19, Line 67, in Claim 15, delete "articular" and insert --particular-- therefor In Column 19, Line 67, in Claim 15, after "postings;", insert a Line Break In Column 20, Line 13, in Claim 16, after "comprises:", insert a Line Break In Column 20, Line 67, in Claim 21, delete "network" and insert --network,-- therefor In Column 21, Line 2, in Claim 21, delete "member" and insert --member,-- therefor In Column 21, Line 3, in Claim 21, delete "posting;" and insert --postings;-- therefor In Column 21, Line 4, in Claim 21, delete "articular" and insert --particular-- therefor In Column 21, Line 10, in Claim 21, delete "Particular" and insert --particular-- therefor Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*